(12) United States Patent
Hua et al.

(10) Patent No.: US 11,779,038 B2
(45) Date of Patent: Oct. 10, 2023

(54) FULLY-AUTOMATED SUSHI MAKING APPARATUS

(71) Applicant: NANTONG UNIVERSITY, Nantong (CN)

(72) Inventors: Liang Hua, Nantong (CN); Zeguang Zhang, Nantong (CN); Ping Gu, Nantong (CN); Yisheng Huang, Nantong (CN); Chunkai Yan, Nantong (CN); Wenbo Su, Nantong (CN); Guoqing Wang, Nantong (CN); Jinqiang Zhao, Nantong (CN)

(73) Assignee: NANTONG UNIVERSITY, Nantong (CN)

( * ) Notice: Subject to any disclaimer, the term of this patent is extended or adjusted under 35 U.S.C. 154(b) by 0 days.

(21) Appl. No.: 17/052,491

(22) PCT Filed: Feb. 24, 2020

(86) PCT No.: PCT/CN2020/076322
§ 371 (c)(1),
(2) Date: Nov. 2, 2020

(87) PCT Pub. No.: WO2020/207127
PCT Pub. Date: Oct. 15, 2020

(65) Prior Publication Data
US 2022/0386661 A1  Dec. 8, 2022

(51) Int. Cl.
*A23L 7/126* (2016.01)
*A23P 20/20* (2016.01)
(Continued)

(52) U.S. Cl.
CPC ............... *A23L 7/126* (2016.08); *A23L 7/122* (2016.08); *A23P 20/20* (2016.08); *A47J 43/20* (2013.01)

(58) Field of Classification Search
CPC .......... A23L 7/126; A23L 7/122; A23P 20/20; A47J 43/20
(Continued)

(56) References Cited

U.S. PATENT DOCUMENTS 5,634,396 A * 6/1997 Isobe ..................... A21C 9/063
99/450.6
6,053,097 A * 4/2000 Suzuki ................... A23L 7/126
99/450.2
(Continued)

*Primary Examiner* — Omar Flores Sanchez
(74) *Attorney, Agent, or Firm* — CBM PATENT CONSULTING, LLC

(57) ABSTRACT

A fully-automated sushi making apparatus, comprising a fixed plate (1), a container module (2), an annular shielding module (3), a center shielding module (4), a dispensing module (7), a ring-shaped isolation module (5), a cylindrical pushing module (6), an extraction module (8), a recovery module (9), and a controller (10). The controller controls vertical drive units (52, 62, 81) and horizontal drive units (31, 41, 51, and 61) to drive the connected annular shielding module, ring-shaped isolation module, and cylindrical pushing module to perform layerwise removal of rice from the container module, then drives the center shielding module, the dispensing module, and the cylindrical pushing module to add sushi ingredients into the hollow center of the rice removed from the container module, and finally drives the extraction module, the annular shielding module, and the center shielding module to move in unison to extract the completed sushi.

5 Claims, 3 Drawing Sheets

(51) Int. Cl.
*A23L 7/122* (2016.01)
*A47J 43/20* (2006.01)

(58) Field of Classification Search
USPC .......................................................... 99/450.1
See application file for complete search history.

(56) References Cited

U.S. PATENT DOCUMENTS

| | | | |
|---|---|---|---|
| 2021/0007377 A1* | 1/2021 | De Picciotto | A23L 7/126 |
| 2021/0267256 A1* | 9/2021 | Kwok | A23K 50/42 |
| 2022/0279980 A1* | 9/2022 | Campbell | A47J 43/20 |
| 2022/0304367 A1* | 9/2022 | Martin | A24C 5/44 |
| 2023/0052096 A1* | 2/2023 | Petit | A23P 20/20 |

* cited by examiner

FULLY-AUTOMATED SUSHI MAKING APPARATUS

TECHNICAL FIELD

The present invention relates to a fully-automated sushi making apparatus.

DESCRIPTION OF THE RELATED ART

Sushi is widely loved by the public because of its delicious taste and simple production steps. Most of the sushi sold in the past were handmade, which has the disadvantages of low production efficiency, unsatisfied sanitary conditions and high labor cost. However, the existing sushi making machines on the market are complex in structure and low in automation. In the process of making sushi, the staff are required to add the taste materials manually, which does not reduce the labor cost. At the same time, due to the unreasonable design of its own structure, the probability of machine failure in the production process is high, which leads to the difficulty of popularizing automatic life making drivers.

Technical Issues

The object of the invention is to provide a fully-automated sushi making apparatus.

A fully-automated sushi making apparatus comprises a fixed plate, a container module, an annular shielding module, a center shielding module, a dispensing module, a ring-shaped isolation module, a cylindrical pushing module, an extraction module, a recovery module and a controller;

The fixed plate comprises a bottom plate, a top plate and a rear plate, is used for fixing the apparatus.

The container module is used to provide a space for sushi processing, and comprises a processing barrel for containing rice to be wrapped with nori slices, and a container support, wherein the processing barrel is in the shape of a hollow cylinder with two open ends and is fixed to a certain height of the bottom plate through the container support;

The annular shielding module and the center shielding module are used to prevent rice from being scattered in the sushi processing process and push processed sushi out of the processing barrel, the annular shielding module is fixed to the top plate, and the center shielding module is fixed to the bottom plate;

The annular shielding module comprises a first horizontal drive unit and a first drive rod, wherein a first sliding block is mounted on the first horizontal drive unit and reciprocates along the axis of the processing barrel, the first drive rod is composed of a first L-shaped connecting rod and a first shielding plate, one end of the first L-shaped connecting rod is vertically connected to the sliding block of the first horizontal drive unit, the other end of the first L-shaped connecting rod is vertically connected to a side, away from the container module, of the first shielding plate, the center of the first shielding plate is located on an extension line of the axis of the processing barrel, the first horizontal drive unit drives the first shielding plate to move in a left opening and interior of the processing barrel through the first L-shaped connecting rod to shield rice in the sushi processing process so as to prevent the rice from falling and to push finished sushi out of the processing barrel after sushi processing;

The center shielding module comprises a second horizontal drive unit and a second drive rod, wherein a second sliding block is mounted on the second horizontal drive unit and reciprocates along the axis of the processing barrel, the second drive rod is composed of a second L-shaped connecting rod and a second shielding plate, one end of the second L-shaped connecting rod is vertically connected to the sliding block of the second horizontal drive unit, the other end of the second L-shaped connecting rod is vertically connected to a side, away from the container module, of the second shielding plate, the center of the second shielding plate is located on the extension line of the axis of the processing barrel, and the second horizontal drive unit drives the second shielding plate to move in the left opening and interior of the processing barrel through the second L-shaped connecting rod to shield rice in the sushi processing process so as to prevent the rice from falling and to push finished sushi out of the processing barrel after sushi processing;

The first shielding plate, connected to one end of the first L-shaped connecting rod, of the annular shielding module is annular and has an annular outer circle identical in shape with an inner circle of the processing barrel;

The second shielding plate, connected to one end of the second L-shaped connecting rod, of the center shielding module is circular and has a circular edge identical in shape with an inner circle, connected to the annular shielding plate, of the annular shielding module;

The dispensing module comprises a dispensing support, a concave storage unit and a rectangular pushing unit, wherein ingredients for sushi processing are stored in the concave storage unit, the rectangular pushing unit comprises a rectangular pushing plate which is inlaid in the concave storage unit and a horizontal pushing mechanism which is vertically mounted on a side, away from the processing barrel, of the rectangular pushing plate and is able to drive the rectangular pushing plate to stretch and retreat repeatedly in the concave storage unit, and the dispensing support is vertically mounted on the concave storage unit, fixes the concave storage unit on the bottom plate, and is used to push the ingredients for sushi processing out of the concave storage unit;

The ring-shaped isolation module comprises a first vertical drive unit and a third horizontal drive unit, wherein the first vertical drive unit is disposed on the third horizontal drive unit and is driven by the third horizontal drive unit to reciprocate along the center axis of the processing barrel, the movement direction of the third horizontal drive unit is parallel to the center axis of the processing barrel, and the movement direction of the first vertical drive unit, the movement direction of the third horizontal drive unit and the center axis of the processing barrel are coplanar;

The cylindrical pushing module comprises a second vertical drive unit and a fourth horizontal drive unit, wherein the second vertical drive unit is disposed on the fourth horizontal drive unit and is driven by the fourth horizontal drive unit to reciprocate along the center axis of the processing barrel, the movement direction of the fourth horizontal drive unit is parallel to the center axis of the processing barrel, and the movement direction of the second vertical drive unit, the movement direction of the fourth horizontal drive unit and the center axis of the processing barrel are coplanar;

The ring-shaped isolation module is used to layer rice in the processing barrel and temporarily store the ingredients for sushi processing pushed out by the dispensing module; a thin-walled hollow cylindrical device is mounted on the vertical drive unit of the ring-shaped isolation module and has a front half in the shape of a thin-walled ring and a rear half in the shape of a thin-walled half ring; after the front half of the thin-walled hollow cylindrical device is inserted into the processing barrel, the interior of the processing barrel is divided into an inner layer and an outer layer by the front half, and the ingredients for sushi processing pushed out by the dispensing module are temporarily stored in the rear half;

The cylindrical pushing module is used to push out the rice stored in the front half of the thin-walled hollow cylindrical device and push the ingredients for sushi processing in the rear half of the thin-walled hollow cylindrical device into the processing barrel, and an ingredient pushing cylinder is mounted on the vertical drive unit of the cylindrical pushing module and is able to reciprocate in the thin-walled hollow cylindrical device along the center axis of the processing barrel after the front half of the ring-shaped isolation module is inserted into the processing barrel;

The extraction module comprises a third vertical drive unit and an extraction plate for extracting finished sushi pushed out of the processing barrel, is disposed above the right side of the processing barrel and is located above the dispensing module, and the vertical drive unit can stretch downwards to move the extraction plate to a position below a right opening of the processing barrel to extract the finished sushi pushed out via the right opening of the processing barrel;

The recovery module comprises a recovery pushing unit which is a recovery box, and a second horizontal push-rod motor, wherein the second horizontal push-rod motor is vertically mounted on the rear plate, and the recovery box is a hollow uncovered cuboid, is mounted on the head of the second horizontal push-rod motor, is located below the left opening of the processing barrel of the container module, and is driven by the second horizontal-rod motor to stretch and retreat to recover the rice in the inner layer of the processing barrel;

The controller is connected to the first vertical drive unit, the second vertical drive unit, the third vertical drive unit, the first horizontal drive unit, the second horizontal drive unit, the third horizontal drive unit, the fourth horizontal drive unit and the horizontal pushing mechanism of the rectangular pushing unit to control the operation of the first vertical drive unit, the second vertical drive unit, the third vertical drive unit, the first horizontal drive unit, the second horizontal drive unit, the third horizontal drive unit, the fourth horizontal drive unit and the horizontal pushing mechanism of the rectangular pushing unit;

The annular shielding module and the center shielding module are both disposed on the left side of the processing barrel;

The ring-shaped isolation module is disposed below the right side of the processing barrel;

The cylindrical pushing module is disposed on the right side of the ring-shaped isolation module.

The first horizontal drive unit, the second horizontal drive unit, the third horizontal drive unit and the fourth horizontal drive unit each comprise a screw motor, a screw and a nut, wherein an output end of the screw motor is connected to one end of the screw and drives the screw to rotate, and two ends of the screw are connected to bearing pedestals through pivotal bearings so that the screw is able to rotate around the bearing pedestals; the nut is disposed on the screw, and the nut reciprocates in an extension direction of the screw under the effect of a thread on the screw.

The first vertical drive unit, the second vertical drive unit and the third vertical drive unit each comprise a push-rod motor and a push rod, wherein the push-rod motor is disposed on a nut and reciprocates along with the nut in an extension direction of the screw, and one end of the push rod is disposed at an output end of the push-rod motor and vertically reciprocates under the effect of the push-rod motor.

The horizontal pushing mechanism comprises a push-rod motor and a push rod, wherein the push-rod motor is disposed on a nut and reciprocates along with the nut in an extension direction of the screw, and one end of the push rod is disposed at an output end of the push-rod motor and horizontally stretches and retreats under the effect of the push-rod motor.

The fixed plate is made of stainless steel 408.

Beneficial Effects

The invention ensures that the rice and sushi ingredients in the processing barrel will not be spilled during the sushi processing by combining the longitudinal driving unit with the transverse driving unit, improves the hygienic index of the sushi processing and avoids the waste of the food materials. In the process of sushi processing, the rice in the processing barrel is layered to ensure that the outer rice in the processing barrel will not fall off during the process of pushing out the inner layer rice and adding the sushi ingredients, which will affect the sushi processing process, and improve the automation level of the sushi processing and the aesthetic degree of the finished sushi.

DESCRIPTION OF SEVERAL VIEWS OF THE ATTACHED DRAWINGS

Figure 1:
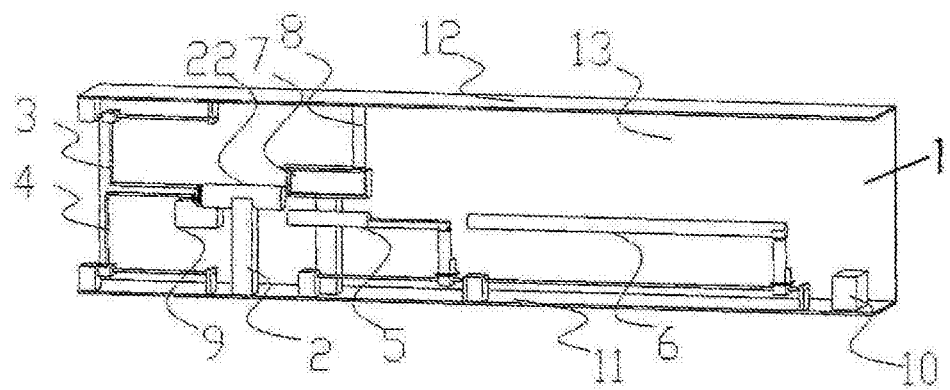
FIG. 1 is an overall structural view of a fully-automated sushi making apparatus in one embodiment of the invention.
Figure 2:
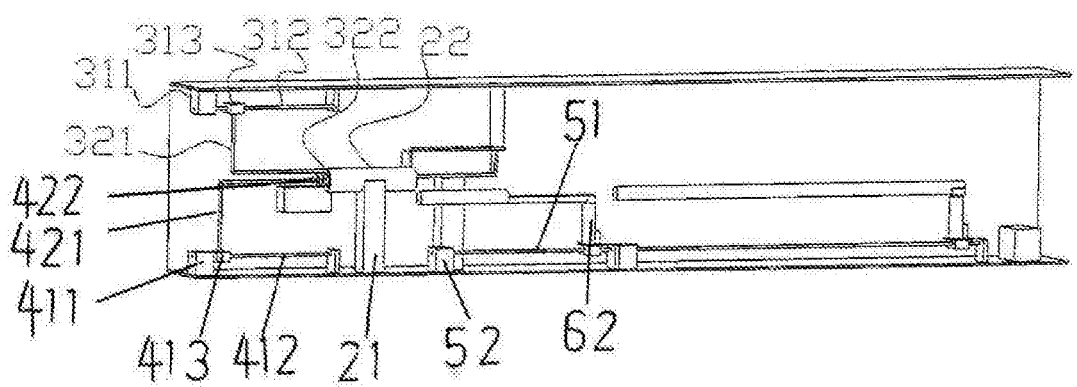
FIG. 2 is a structural diagram of annular shielding of an outer layer of rice of the invention.
Figure 3:
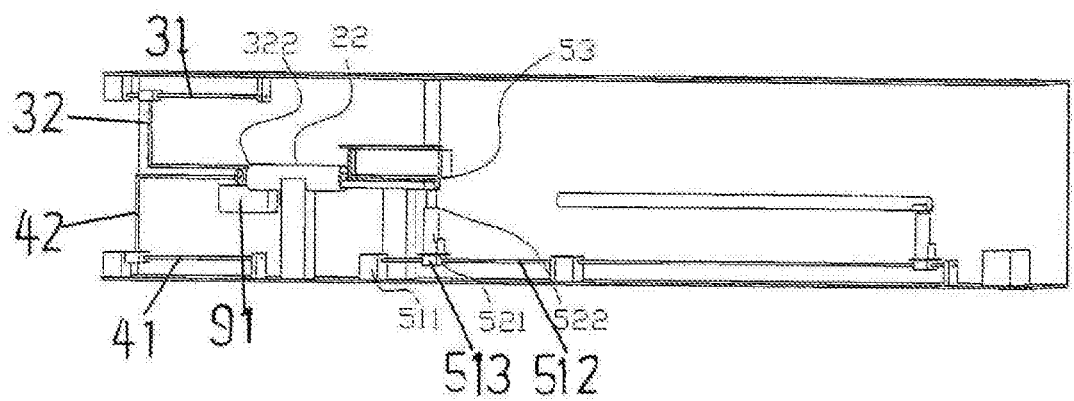
FIG. 3 is a structural diagram of rice layering of the invention.
Figure 4:
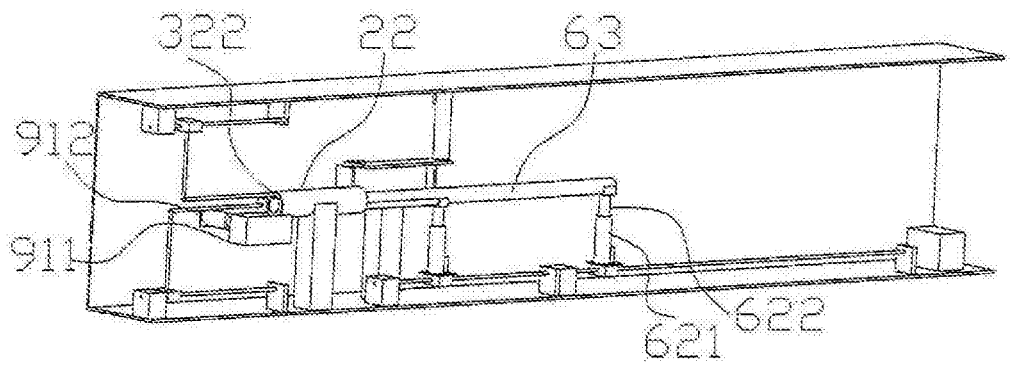
FIG. 4 is a structural diagram of extraction and recovery of an inner layer of rice of the invention.
Figure 5:
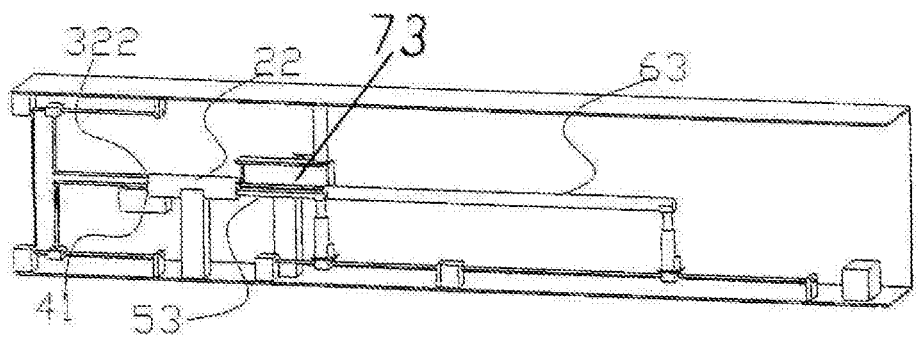
FIG. 5 is a structural diagram of sushi ingredient addition of the invention.
Figure 6:
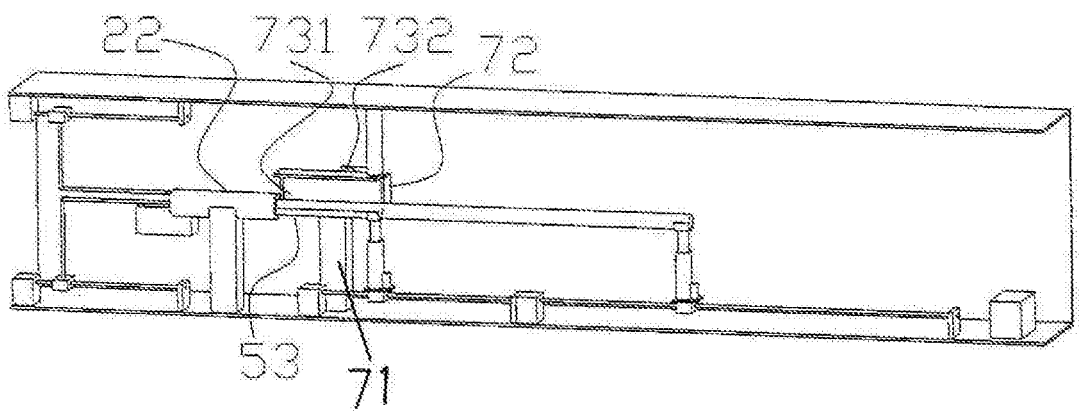
FIG. 6 is a structural diagram of sushi ingredient pushing of the invention.
Figure 7:
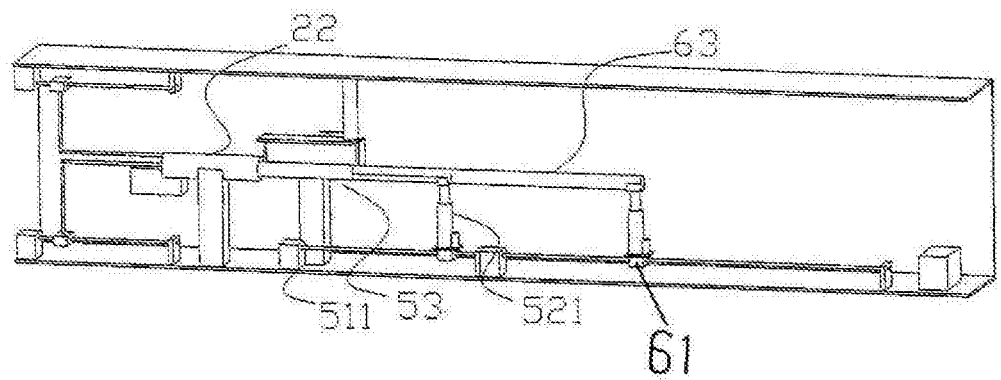
FIG. 7 is a structural diagram of a ring-shaped isolation module and a cylindrical pushing module in a stretching state of the invention.
Figure 8:
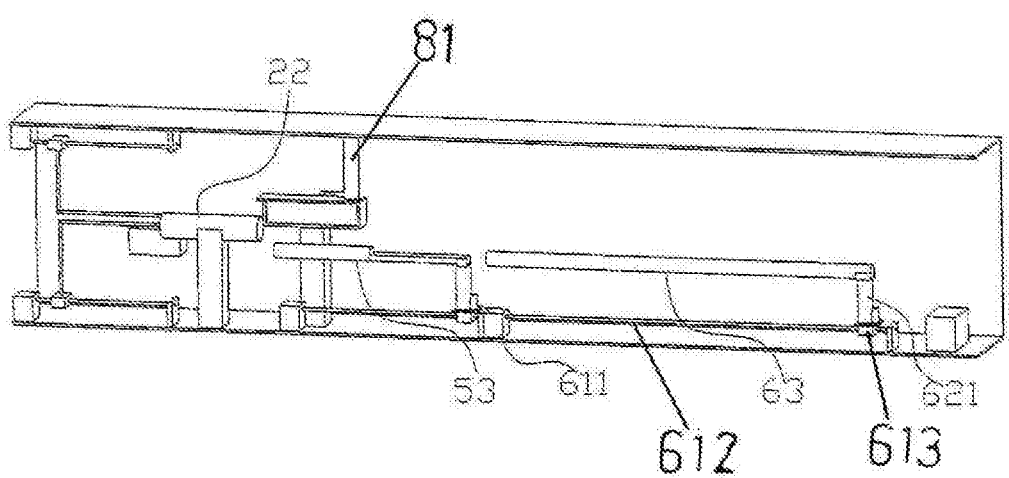
FIG. 8 is a structural diagram of the ring-shaped isolation module and the cylindrical pushing module in a return state of the invention.
Figure 9:
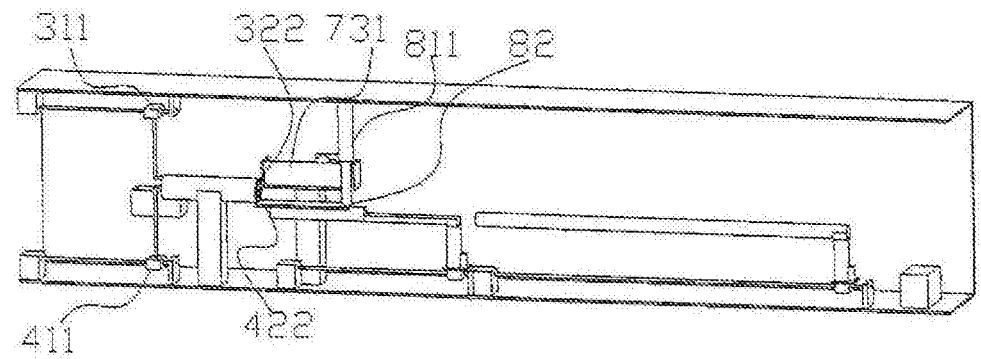
FIG. 9 is a structural diagram of extraction of finished sushi of the invention.

REFERENCE SIGNS 1, fixed plate; 11, bottom plate; 12, top plate; 13, rear plate; 2, container module; 21, container support; 22, processing barrel; 3, annular shielding module; 31, first horizontal drive unit; 311, screw motor; 312, screw; 313, nut; 32, first drive rod; 321, first L-shaped connecting rod; 322, annular shielding plate; 4, center shielding module; 41, second horizontal drive unit; 411, screw motor; 412, screw; 413, nut; 42, second drive rod; 421, second L-shaped connecting rod; 422, annular shielding plate; 5, ring-shaped isolation module; 51, third horizontal drive unit; 511, screw motor; 512, screw; 513, nut; 52, first vertical drive unit; 521, push-rod motor; 522, push rod; 53, thin-walled hollow cylindrical device; 6, cylindrical pushing module; 61, fourth horizontal drive unit; 611, screw motor; 612, screw; 613, nut; 62, vertical drive unit; 621, push-rod motor; 622, push rod; 63, ingredient pushing cylinder; 7, dispensing module; 71, dispensing support; 72, concave storage unit; 73, rectangular pushing unit; 731, pushing plate; 732, horizontal push-rod motor; 8, extraction module; 81, second vertical drive unit; 811, push-rod motor; 82, extraction plate; 9, recovery module; 91, recovery pushing unit; 911, recovery box; 912, horizontal push-rod motor; 10, controller.

DETAILED DESCRIPTION OF THE INVENTION

A fully-automated sushi making apparatus comprises a fixed plate 1, a container module 2, an annular shielding module 3, a center shielding module 4, a dispensing module 7, a ring-shaped isolation module 5, a cylindrical pushing module 6, an extraction module 8, a recovery module 9 and a controller 10;

The fixed plate 1 comprises a bottom plate 11, a top plate 12 and a rear plate 13, is used for fixing the apparatus, and is made of stainless steel 408.

The container module 2 is used to provide a space for sushi processing, and comprises a processing barrel 22 for containing rice to be wrapped with nori slices, and a container support 21, wherein the processing barrel is in the shape of a hollow cylinder with two open ends and is fixed to a certain height of the bottom plate through the container support;

The annular shielding module 3 and the center shielding module 4 are used to prevent rice from being scattered in the sushi processing process and push processed sushi out of the processing barrel 22, the annular shielding module 3 is fixed to the top plate 12, and the center shielding module 4 is fixed to the bottom plate 11;

The annular shielding module comprises a first horizontal drive unit 31 and a first drive rod 32, wherein a first sliding block is mounted on the first horizontal drive unit and reciprocates along the axis of the processing barrel 22, the first drive rod is composed of a first L-shaped connecting rod 321 and a first shielding plate 322, one end of the first L-shaped connecting rod is vertically connected to the sliding block of the first horizontal drive unit, the other end of the first L-shaped connecting rod is vertically connected to a side, away from the container module 2, of the first shielding plate, the center of the first shielding plate is located on an extension line of the axis of the processing barrel 22, the first horizontal drive unit drives the first shielding plate to move in a left opening and interior of the processing barrel through the first L-shaped connecting rod to shield rice in the sushi processing process so as to prevent the rice from falling and to push finished sushi out of the processing barrel after sushi processing;

The center shielding module comprises a second horizontal drive unit 41 and a second drive rod 42, wherein a second sliding block is mounted on the second horizontal drive unit and reciprocates along the axis of the processing barrel, the second drive rod is composed of a second L-shaped connecting rod 421 and a second shielding plate 422, one end of the second L-shaped connecting rod is vertically connected to the sliding block of the second horizontal drive unit, the other end of the second L-shaped connecting rod is vertically connected to a side, away from the container module 2, of the second shielding plate, the center of the second shielding plate is located on the extension line of the axis of the processing barrel 22, and the second horizontal drive unit drives the second shielding plate to move in the left opening and interior of the processing barrel through the second L-shaped connecting rod to shield rice in the sushi processing process so as to prevent the rice from falling and to push finished sushi out of the processing barrel after sushi processing;

The first shielding plate, connected to one end of the first L-shaped connecting rod, of the annular shielding module is annular and has an annular outer circle identical in shape with an inner circle of the processing barrel;

The second shielding plate, connected to one end of the second L-shaped connecting rod, of the center shielding module is circular and has a circular edge identical in shape with an inner circle, connected to the annular shielding plate, of the annular shielding module;

The dispensing module 7 comprises a dispensing support 71, a concave storage unit 72 and a rectangular pushing unit 73, wherein ingredients for sushi processing are stored in the concave storage unit, the rectangular pushing unit comprises a rectangular pushing plate 731 which is inlaid in the concave storage unit and a horizontal pushing mechanism which is vertically mounted on a side, away from the processing barrel, of the rectangular pushing plate and is able to drive the rectangular pushing plate to stretch and retreat repeatedly in the concave storage unit, and the dispensing support is vertically mounted on the concave storage unit, fixes the concave storage unit on the bottom plate, and is used to push the ingredients for sushi processing out of the concave storage unit;

The ring-shaped isolation module 5 comprises a first vertical drive unit 52 and a third horizontal drive unit 53, wherein the first vertical drive unit is disposed on the third horizontal drive unit and is driven by the third horizontal drive unit to reciprocate along the center axis of the processing barrel, the movement direction of the third horizontal drive unit is parallel to the center axis of the processing barrel 22, and the movement direction of the first vertical drive unit, the movement direction of the third horizontal drive unit and the center axis of the processing barrel are coplanar;

The cylindrical pushing module 6 comprises a second vertical drive unit 62 and a fourth horizontal drive unit 61, wherein the second vertical drive unit is disposed on the fourth horizontal drive unit and is driven by the fourth horizontal drive unit to reciprocate along the center axis of the processing barrel 22, the movement direction of the fourth horizontal drive unit is parallel to the center axis of the processing barrel, and the movement direction of the second vertical drive unit, the movement direction of the fourth horizontal drive unit and the center axis of the processing barrel are coplanar;

The ring-shaped isolation module is used to layer rice in the processing barrel and temporarily store the ingredients for sushi processing pushed out by the dispensing module; a thin-walled hollow cylindrical device is mounted on the vertical drive unit of the ring-shaped isolation module and has a front half in the shape of a thin-walled ring and a rear half in the shape of a thin-walled half ring; after the front half of the thin-walled hollow cylindrical device is inserted into the processing barrel, the interior of the processing barrel is divided into an inner layer and an outer layer by the front half, and the ingredients for sushi processing pushed out by the dispensing module are temporarily stored in the rear half;

The cylindrical pushing module is used to push out the rice stored in the front half of the thin-walled hollow cylindrical device and push the ingredients for sushi processing in the rear half of the thin-walled hollow cylindrical device into the processing barrel, and an ingredient pushing cylinder is mounted on the vertical drive unit of the cylindrical pushing module and is able to reciprocate in the thin-walled hollow cylindrical device along the center axis of the processing barrel after the front half of the ring-shaped isolation module is inserted into the processing barrel;

The extraction module 8 comprises a third vertical drive unit 81 and an extraction plate 82 for extracting finished sushi pushed out of the processing barrel, is disposed above the right side of the processing barrel and is located above the dispensing module, and the vertical drive unit can stretch downwards to move the extraction plate to a position below a right opening of the processing barrel to extract the finished sushi pushed out via the right opening of the processing barrel;

The recovery module 9 comprises a recovery pushing unit 91 which is a recovery box 911, and a second horizontal push-rod motor 912, wherein the second horizontal push-rod motor 912 is vertically mounted on the rear plate, and the recovery box is a hollow uncovered cuboid, is mounted on the head of the second horizontal push-rod motor, is located below the left opening of the processing barrel of the container module, and is driven by the second horizontal-rod motor to stretch and retreat to recover the rice in the inner layer of the processing barrel;

The controller 10 is connected to the first vertical drive unit, the second vertical drive unit, the third vertical drive unit, the first horizontal drive unit, the second horizontal drive unit, the third horizontal drive unit, the fourth horizontal drive unit and the horizontal pushing mechanism of the rectangular pushing unit to control the operation of the first vertical drive unit, the second vertical drive unit, the third vertical drive unit, the first horizontal drive unit, the second horizontal drive unit, the third horizontal drive unit, the fourth horizontal drive unit and the horizontal pushing mechanism of the rectangular pushing unit;

The annular shielding module and the center shielding module are both disposed on the left side of the processing barrel;

The ring-shaped isolation module is disposed below the right side of the processing barrel;

The cylindrical pushing module is disposed on the right side of the ring-shaped isolation module.

The first horizontal drive unit, the second horizontal drive unit, the third horizontal drive unit and the fourth horizontal drive unit each comprise a screw motor, a screw and a nut, wherein an output end of the screw motor is connected to one end of the screw and drives the screw to rotate, and two ends of the screw are connected to bearing pedestals through pivotal bearings so that the screw is able to rotate around the bearing pedestals; the nut is disposed on the screw, and the nut reciprocates in an extension direction of the screw under the effect of a thread on the screw.

The first vertical drive unit, the second vertical drive unit and the third vertical drive unit each comprise a push-rod motor and a push rod, wherein the push-rod motor is disposed on a nut and reciprocates along with the nut in an extension direction of the screw, and one end of the push rod is disposed at an output end of the push-rod motor and vertically reciprocates under the effect of the push-rod motor.

The horizontal pushing mechanism comprises a push-rod motor and a push rod, wherein the push-rod motor is disposed on a nut and reciprocates along with the nut in an extension direction of the screw, and one end of the push rod is disposed at an output end of the push-rod motor and horizontally stretches and retreats under the effect of the push-rod motor.

In this embodiment, a first screw motor 311 is powered on to drive a first nut 313 to move rightwards, the first nut 313 is connected to the first L-shaped connecting rod 321 to move synchronously, the first shielding plate 322 moves along the axis of the processing barrel 22 to move along the axis of the processing barrel 22, and when moving to the left opening of the processing barrel 22, the first shielding plate 322 shields part of the rice in the processing barrel 22.

The first shielding plate 322 shields the left opening of the processing barrel 22, a first push-rod motor 521 is powered on to drive a first push rod 522 to move upwards, and the thin-walled hollow cylindrical device 53 is drive to move upwards; when the center axis of the thin-walled hollow cylindrical device 53 is collinear with the axis of the processing barrel 22, the first push-rod motor 521 is powered off, and a third lead-screw motor 511 is powered on to drive the thin-walled hollow cylindrical device 53 to move towards the processing barrel 22; when the left end of the thin-walled hollow cylindrical device 53 reaches the left opening of the processing barrel 22, the third screw-rod motor 511 is powered off; when the front half of the thin-walled hollow cylindrical device 53 entirely enters the processing barrel 22, the rice in the processing barrel is divided into an outer layer and an inner layer by the thin-walled hollow cylindrical device 53.

A second horizontal push-rod motor 912 stretches to convey the recovery box 911 to a position below the left opening of the processing barrel 22, and a second push-rod motor 621 is powered on to drive the second push rod 622 to move upwards; when the center axis of the ingredient pushing cylinder 63 is collinear with the axis of the processing barrel 22, the second push-rod motor 621 is powered off, and a fourth screw motor 611 is powered on to drive the ingredient pushing cylinder 63 to move towards the processing barrel 22; when the left end of the ingredient pushing cylinder 63 reaches the left opening of the processing barrel 22, the fourth screw motor 611 is powered off, the ingredient pushing cylinder 63 enters the processing barrel 22 to push the rice in the inner layer divided by the thin-walled hollow cylindrical device 53 out of the left opening of the processing barrel 22, the rice falls into the recovery box 911, and the process of sushi removal is completed.

The second horizontal push-rod motor 912 drives the recovery box 911 to retreat, the fourth screw motor 611 retreats to drive the ingredient pushing cylinder 63 to move to the right end of the thin-walled hollow cylindrical device 53 to empty the rear half of the thin-walled hollow cylindrical device 53 to provide a space for sushi ingredients to be added later, then a second screw motor 411 drives the cylindrical shielding plate 41 to move towards the processing barrel 22 to reach the left opening of the processing barrel 22, then the second shielding plate 422 is embedded into the first shielding plate 322 to completely seal the left opening of the processing barrel 22, a first horizontal push-rod motor 732 starts to move to push the rectangular pushing plate 731 connected to the first horizontal push-rod motor 732 towards the thin-walled hollow cylindrical device 53, and sushi ingredients such as cucumbers and ham sausages stored in the concave storage unit 72 are pushed into the semi-cylindrical rear half of the thin-walled hollow cylindrical device 53.

The fourth screw motor 611 drives the ingredient pushing cylinder 63 to move towards the processing barrel 22 again, and when reaching the right opening of the processing barrel 22, the ingredient pushing cylinder 63 stops to push the sushi ingredients temporarily stored in rear half of the thin-walled hollow cylindrical device 53 into the front half of the thin-walled hollow cylindrical device 53.

The third screw motor 511 drives the thin-walled hollow cylindrical device 53 to be extracted from the processing barrel 22, and the thin-walled hollow cylindrical device 53 stops after being completely extracted from the processing barrel 22; at this moment, the fourth screw motor 611 drives the ingredient pushing cylinder 63 to be extracted from the thin-walled hollow cylinder device 53; when the ingredient pushing cylinder 63 retreats to be not in contact with the thin-walled hollow cylindrical device 53, the third screw motor 511 and the fourth screw motor 611 respectively drive the thin-walled hollow cylindrical device 53 and the ingredient pushing cylinder 63 to return to an initial state, and thus, the sushi processing process is completed.

The third push-rod motor 811 stretches to move the extraction plate 82 connected thereto to a position below the right opening of the processing barrel 22, and at this moment, the first screw motor 311 and the second screw motor 411 synchronously drive the first shielding plate 322 and the first shielding plate 422 to move towards the right end of the processing barrel 22; when reaching the right opening of the processing barrel 22, the first shielding plate 322 and the first shielding plate 422 stops moving, and finished sushi is pushed onto the extraction plate 82; at this moment, the first horizontal push-rod motor 732, the first screw motor 311, the second screw motor 411 and the third push-rod motor 811 synchronously drive the rectangular pushing plate 731, the first shielding plate 322, the second shielding plate 422 and the extraction plate 82 to return to initial positions, and the sushi extraction process is completed. In this way, the whole sushi making process is completed.

What is claimed is:

1. A fully-automated sushi making apparatus is comprising: comprises a fixed plate, a container module, an annular shielding module, a center shielding module, a dispensing module, a ring-shaped isolation module, a cylindrical pushing module, an extraction module, a recovery module and a controller;

the fixed plate comprises a bottom plate, a top plate and a rear plate, is used for fixing the apparatus;

the container module is used to provide a space for sushi processing, and comprises a processing barrel for containing rice to be wrapped with nori slices, and a container support, wherein the processing barrel is in the shape of a hollow cylinder with two open ends and is fixed to a certain height of the bottom plate through the container support;

the annular shielding module and the center shielding module are used to prevent rice from being scattered in the sushi processing process and push processed sushi out of the processing barrel, the annular shielding module is fixed to the top plate, and the center shielding module is fixed to the bottom plate;

the annular shielding module comprises a first horizontal drive unit and a first drive rod, wherein a first sliding block is mounted on the first horizontal drive unit and reciprocates along the axis of the processing barrel, the first drive rod is composed of a first L-shaped connecting rod and a first shielding plate, one end of the first L-shaped connecting rod is vertically connected to the sliding block of the first horizontal drive unit, the other end of the first L-shaped connecting rod is vertically connected to a side, away from the container module, of the first shielding plate, the center of the first shielding plate is located on an extension line of the axis of the processing barrel, the first horizontal drive unit drives the first shielding plate to move in a left opening and interior of the processing barrel through the first L-shaped connecting rod to shield rice in the sushi processing process so as to prevent the rice from falling and to push finished sushi out of the processing barrel after sushi processing;

the center shielding module comprises a second horizontal drive unit and a second drive rod, wherein a second sliding block is mounted on the second horizontal drive unit and reciprocates along the axis of the processing barrel, the second drive rod is composed of a second L-shaped connecting rod and a second shielding plate, one end of the second L-shaped connecting rod is vertically connected to the sliding block of the second horizontal drive unit, the other end of the second L-shaped connecting rod is vertically connected to a side, away from the container module, of the second shielding plate, the center of the second shielding plate is located on the extension line of the axis of the processing barrel, and the second horizontal drive unit drives the second shielding plate to move in the left opening and interior of the processing barrel through the second L-shaped connecting rod to shield rice in the sushi processing process so as to prevent the rice from falling and to push finished sushi out of the processing barrel after sushi processing;

the first shielding plate, connected to one end of the first L-shaped connecting rod, of the annular shielding module is annular and has an annular outer circle identical in shape with an inner circle of the processing barrel;

the second shielding plate, connected to one end of the second L-shaped connecting rod, of the center shielding module is circular and has a circular edge identical in shape with an inner circle, connected to the annular shielding plate, of the annular shielding module;

the dispensing module comprises a dispensing support, a concave storage unit and a rectangular pushing unit, wherein ingredients for sushi processing are stored in the concave storage unit, the rectangular pushing unit comprises a rectangular pushing plate which is inlaid in the concave storage unit and a horizontal pushing mechanism which is vertically mounted on a side, away from the processing barrel, of the rectangular pushing plate and is able to drive the rectangular pushing plate to stretch and retreat repeatedly in the concave storage unit, and the dispensing support is vertically mounted on the concave storage unit, fixes the concave storage unit on the bottom plate, and is used to push the ingredients for sushi processing out of the concave storage unit;

the ring-shaped isolation module comprises a first vertical drive unit and a third horizontal drive unit, wherein the first vertical drive unit is disposed on the third horizontal drive unit and is driven by the third horizontal drive unit to reciprocate along the center axis of the processing barrel, the movement direction of the third horizontal drive unit is parallel to the center axis of the processing barrel, and the movement direction of the first vertical drive unit, the movement direction of the third horizontal drive unit and the center axis of the processing barrel are coplanar;

the cylindrical pushing module comprises a second vertical drive unit and a fourth horizontal drive unit, wherein the second vertical drive unit is disposed on the fourth horizontal drive unit and is driven by the fourth horizontal drive unit to reciprocate along the center axis of the processing barrel, the movement direction of the fourth horizontal drive unit is parallel to the center axis of the processing barrel, and the movement direction of the second vertical drive unit, the movement direction of the fourth horizontal drive unit and the center axis of the processing barrel are coplanar;

the ring-shaped isolation module is used to layer rice in the processing barrel and temporarily store the ingredients for sushi processing pushed out by the dispensing module; a thin-walled hollow cylindrical device is mounted on the vertical drive unit of the ring-shaped isolation module and has a front half in the shape of a thin-walled ring and a rear half in the shape of a thin-walled half ring; after the front half of the thin-walled hollow cylindrical device is inserted into the processing barrel, the interior of the processing barrel is divided into an inner layer and an outer layer by the front half, and the ingredients for sushi processing pushed out by the dispensing module are temporarily stored in the rear half;

the cylindrical pushing module is used to push out the rice stored in the front half of the thin-walled hollow cylindrical device and push the ingredients for sushi processing in the rear half of the thin-walled hollow cylindrical device into the processing barrel, and an ingredient pushing cylinder is mounted on the vertical drive unit of the cylindrical pushing module and is able to reciprocate in the thin-walled hollow cylindrical device along the center axis of the processing barrel after the front half of the ring-shaped isolation module is inserted into the processing barrel;

the extraction module comprises a third vertical drive unit and an extraction plate for extracting finished sushi pushed out of the processing barrel, is disposed above the right side of the processing barrel and is located above the dispensing module, and the vertical drive unit can stretch downwards to move the extraction plate to a position below a right opening of the processing barrel to extract the finished sushi pushed out via the right opening of the processing barrel;

the recovery module comprises a recovery pushing unit which is a recovery box, and a second horizontal push-rod motor, wherein the second horizontal push-rod motor is vertically mounted on the rear plate, and the recovery box is a hollow uncovered cuboid, is mounted on the head of the second horizontal push-rod motor, is located below the left opening of the processing barrel of the container module, and is driven by the second horizontal-rod motor to stretch and retreat to recover the rice in the inner layer of the processing barrel;

the controller is connected to the first vertical drive unit, the second vertical drive unit, the third vertical drive unit, the first horizontal drive unit, the second horizontal drive unit, the third horizontal drive unit, the fourth horizontal drive unit and the horizontal pushing mechanism of the rectangular pushing unit to control the operation of the first vertical drive unit, the second vertical drive unit, the third vertical drive unit, the first horizontal drive unit, the second horizontal drive unit, the third horizontal drive unit, the fourth horizontal drive unit and the horizontal pushing mechanism of the rectangular pushing unit;

the annular shielding module and the center shielding module are both disposed on the left side of the processing barrel;

the ring-shaped isolation module is disposed below the right side of the processing barrel;

the cylindrical pushing module is disposed on the right side of the ring-shaped isolation module.

2. The fully-automated sushi making apparatus according to claim 1, comprising: the first horizontal drive unit, the second horizontal drive unit, the third horizontal drive unit and the fourth horizontal drive unit each comprise a screw motor, a screw and a nut, wherein an output end of the screw motor is connected to one end of the screw and drives the screw to rotate, and two ends of the screw are connected to bearing pedestals through pivotal bearings so that the screw is able to rotate around the bearing pedestals; the nut is disposed on the screw, and the nut reciprocates in an extension direction of the screw under the effect of a thread on the screw.

3. The fully-automated sushi making apparatus according to claim 1, comprising: the first vertical drive unit, the second vertical drive unit and the third vertical drive unit each comprise a push-rod motor and a push rod, wherein the push-rod motor is disposed on a nut and reciprocates along with the nut in an extension direction of the screw, and one end of the push rod is disposed at an output end of the push-rod motor and vertically reciprocates under the effect of the push-rod motor.

4. The fully-automated sushi making apparatus according to claim 1, comprising: the horizontal pushing mechanism comprises a push-rod motor and a push rod, wherein the push-rod motor is disposed on a nut and reciprocates along with the nut in an extension direction of the screw, and one end of the push rod is disposed at an output end of the push-rod motor and horizontally stretches and retreats under the effect of the push-rod motor.

5. The fully-automated sushi making apparatus according to claim 1, comprising: the fixed plate is made of stainless steel 408.

* * * * *